United States Patent [19]

Teraoka

[11] 4,440,248

[45] Apr. 3, 1984

[54] BAR CODE PRINTER

[75] Inventor: Kazuharu Teraoka, Tokyo, Japan

[73] Assignee: Teraoka Seikosho Co., Ltd., Tokyo, Japan

[21] Appl. No.: 231,363

[22] Filed: Feb. 3, 1981

[30] Foreign Application Priority Data

| Feb. 9, 1980 | [JP] | Japan | 55-15102 |
| Feb. 9, 1980 | [JP] | Japan | 55-15103 |
| Feb. 19, 1980 | [JP] | Japan | 55-19861 |
| Feb. 20, 1980 | [JP] | Japan | 55-21729[U] |
| Jul. 18, 1980 | [JP] | Japan | 55-98880 |
| Jul. 18, 1980 | [JP] | Japan | 55-98881 |
| Oct. 4, 1980 | [JP] | Japan | 55-138891 |

[51] Int. Cl.$^3$ .............. G01G 23/38; G06K 7/10; G01D 9/00
[52] U.S. Cl. .................. 177/4; 235/462; 346/9
[58] Field of Search ............. 177/4; 235/383, 462, 235/494; 346/9

[56] References Cited

U.S. PATENT DOCUMENTS

| 3,961,747 | 6/1976 | Small et al. | 235/383 |
| 4,229,794 | 10/1980 | Foster | 364/466 |
| 4,307,293 | 12/1981 | Lazzarotti et al. | 235/462 |

Primary Examiner—George H. Miller, Jr.

Attorney, Agent, or Firm—Birch, Stewart, Kolasch & Birch

[57] ABSTRACT

A bar code printer is disclosed which may be used as a standard desk type bar code printer, a weighing bar code printer, etc. by connecting outer peripheral equipment, such as weighing instruments or price indicating balances, to the bar code printer. A change-over circuit can select an input signal from either the input unit of the bar code printer or from the outer peripheral equipment, the input signal energizing a control circuit which develops control signals to drive a bar code printing system and an indicating system. The printer has differing types of bar code systems stored therein and by entering a flag code, a specific bar code system may be selected. Also, the differing types of bar code systems may be accomodated since the bar code is divided into a fixed part (for common use in all systems) and a variable part (differing numerals between bar code systems). The column numbers of the variable part of the bar code may be identified prior to introducing print data via the input unit and the numerals from the input for the variable part may be input thereinto. The printing system includes a plurality of heating elements which contact a heat sensitive surface of the labels. This causes the printing of the bars on the bar code label. The control circuit may include means for maintaining a constant, uniform width of the bars on the bar code label.

4 Claims, 35 Drawing Figures

FIG. 3
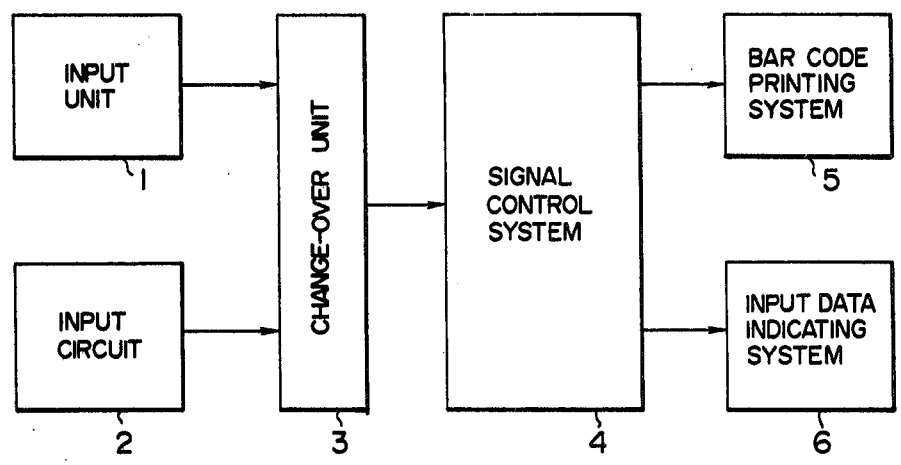
FIG. 5
FIG. 4
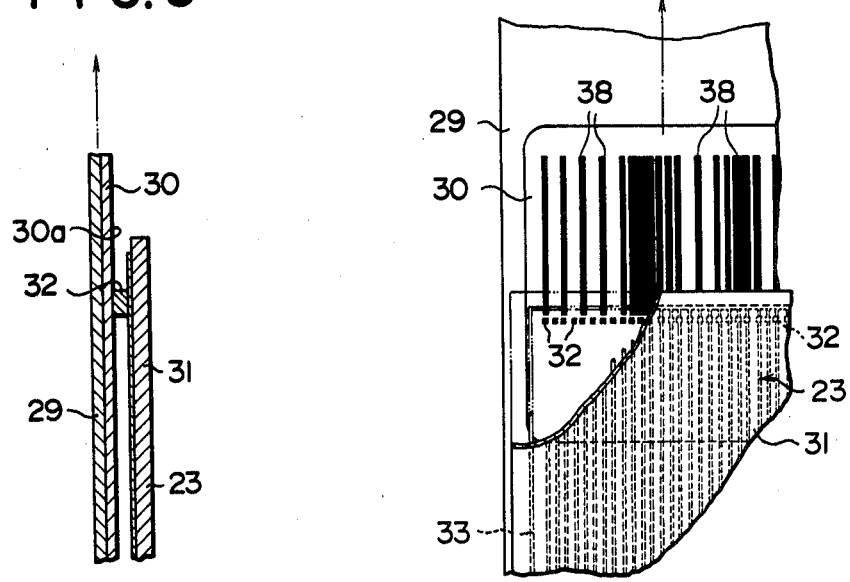

FIG. 10

| KEY OPERATION \ COLUMN | 1 | 2 | 3 | 4 | 5 | 6 | 7 | 8 | 9 | 10 | 11 | 12 | 13 |
|---|---|---|---|---|---|---|---|---|---|---|---|---|---|
| CHANG-OVER SWITCH TO PROGRAM. | 1 | 1 | 1 | 1 | 1 | 1 | 1 | 1 | 1 | 1 | 1 | 1 | 1 |
| B B B | | 1 | 1 | 1 | 1 | 1 | 1 | 1 | 1 | 1 | 1 | 1 | 1 |
| FLAG 2 | | | | 2 | 1 | 1 | 1 | 1 | 1 | 1 | 1 | 1 | 1 |
| CODE 1 2 | | | | 2 | – | 2 | 1 | 1 | 1 | 1 | 1 | 1 | 1 |
| PRICE 0 M M M | | | | 2 | – | 2 | 0 | . | . | . | 1 | 1 | 1 |
| C | | | | 2 | – | 2 | 0 | . | . | . | C | 1 | 1 |
| B B | | | | 2 | – | 2 | 0 | . | . | . | C | | |

FIG. 11

| KEY OPERATION \ COLUMN | 1 | 2 | 3 | 4 | 5 | 6 | 7 | 8 | 9 | 10 | 11 | 12 | 13 |
|---|---|---|---|---|---|---|---|---|---|---|---|---|---|
| PRICE 1 5 0 | | | | 2 | – | 2 | 0 | . | .5 | .0 | C | | |
| LABEL ISSUE | | | | 2 | – | 2 | 0 | . | .5 | .0 | 9 | | |
| REPEAT AUTOMATIC ISSUE M | | | | – – – | – | – – – | – – – | | | | – – – | | |
| | | | | 2 | – | 2 | 0 | . | .2 | .7 | C | | |
| PRICE 4 2 7 | | | | 2 | – | 2 | 0 | . | .2 | .7 | C | | |
| LABEL ISSUE | | | | 2 | – | 2 | 0 | . | .2 | .7 | 2 | | |

BAR CODE PRINTER

BACKGROUND OF THE INVENTION

1. Field of the Invention

This invention relates to a bar code printer, particularly to an automatic printing apparatus of bar code on a label to be adhered to articles sold in department stores or supermarkets. More specifically, this invention relates to an improved bar code printer comprising an input unit feeding prescribed input data as input signals in a prescribed form into a signal control system, the signal control system operating a bar code printing system and an indicating system according to the input signals, the bar code printing system and the indicating system.

2. Description of the Prior Art

First, the input unit of the bar code printer will be discussed.

Conventional bar code printers are classified into two types, i.e. a desk type bar code printer and a weighing bar code printer. The desk type bar code printer applies to articles without the necessity of weighing, such as processed foods or groceries, and the weighing bar code printer applies to articles to be weighed, such as meat, raw fish, vegetables or fruits. Each of two types can be used only for its sole purpose, either as a desk type bar code printer or as a weighing bar code printer.

In the weighing bar code printer issuing the weight indicating label with bar code, a disadvantage occurs in that two identical labels must be issued for articles which cannot be turned sideways or upside down, such as dished slices of raw fish. In such articles, the weight indicating label must be adhered to the front surface at a readily viewable portion, while the bar code label must be adhered to a flat surface so as to secure the automatic reading using a stationary scanner, that is, the bar code label in such an article must be adhered inevitably to the rear surface. As a result, the two identical labels are required. Accordingly, it is preferable to print the weight indicating label and the bar code label separately for articles such as dished slices of raw fish. For this purpose, one type of bar code printer may be used in which a weight indicating label printer is accompanied by a bar code printer. However, this type cannot be used as a desk type bar code printer, and installation of a further desk type bar code printer in a store may take much space.

The input unit feeds print data to the signal control system by a keying operation according to the markig code. Of various types of the marking code system, the most suitable type for articles to be marked is selected from the code contrast table. The code contrast table of the JAN code type, as an example, is as follows. JAN code corresponds to UPC code in the U.S.A.

| Code System | Flag | |
|---|---|---|
| JAN13NONPLU type | 02 | *I1 I2 I3 I4 I5 P/C P1 P2 P3 P4 C/D |
| JAN 13 PLU type | 04 | I1 I2 I3 I4 I5 I6 I7 I8 I9 I10 C/D |
| JAN8NONPLU type | 2 | I1 I2 P1 P2 P3 P4 C/D |
| JAN 8 PLU type | 0 | I1 I2 I3 I4 I5 I6 C/D |
| others | — | — |

*$I_n$ : item code, $P_n$ : price code, P/C : price check digit, C/D : module check digit In the above table, flag code designates countries or types of in-store marking code, maker code designates makers of articles, item code designates items set by makers or stores under a definite standard, and price code designates prices of articles.

In inputting the price data, difference of numerals between the previous and new input data in even one column requires the inputting of all print data again although the same type of marking code is used.

In the pricing process of various types of articles in a store, therefore, all print data must be input from the beginning per article. This requires much time for the pricing process, and causes a false input of print data. If the pricing process is carried out per section, articles of the same section are treated during a certain time. In the marking code of the JAN13NONPLU type, for example, only the lower two columns of item code and price code vary, and flag code and residual columns of item code are common in the section. Therefore, the marking may be divided into a fixed part of common numerals and a variable part of different numerals.

Any of the code systems selected from the above contrast table follows a rule: flag code at the top (left end), item code, price check digit, price code and module check digit must be registered in sequence. As shown in the code contrast table, however, the various types of code systems are different in the number of columns of item code. Some code systems are different in that some are without price check digit or a price code. Since it is difficult for an operator to memorize all types of code systems correctly and it is liable to cause false input, use of the code contrast table is essential. Accordingly, input operation of the bar code data is not efficient.

If position of flag code and check digital or existence of check digit can be known, residual item code and price code may be easily registered, which eliminates the false input of the bar code data and improves the efficiency of the input operation.

In a conventional manner, numerals in check digit are manually calculated according to a prescribed calculation formula, and the calculated numerals are registered in check digit positions determined by the code system. The calculation requires much time and reduces the working efficiency in the input operation of the bar code data. Moreover the manual calculation is liable to cause a mistake.

In the labels printed by the bar code printer, such as labels by in-store marking, the bar code comprising flag code, item code, price check digit and price code is printed as above described. In a conventional manner, the consumer's price is not indicated on the same label with the bar code, but on a separate price label. Or otherwise, even if the bar code and consumer's price are indicated on the same label, two sorts of price data, i.e. that in the bar code and that for displaying, are set and printed using a desk labeller or a hand labeller. Therefore, the setting operation must be carried out twice and takes much time, thereby it is liable to cause a mistake of setting, resulting in reduction of working efficiency.

Next a bar code printing system will be discussed.

In a conventional manner, since bar code is optically read out by a stationary scanner or pen reader, it must be printed accurately. Requirements of the accuracy are as follows:

(1) Thickness of bars and spacing between bars must be correct.

(2) Bars must be in parallel with each other.

(3) Width of each bar must be uniform throughout the length.
(4) Bar edge must be a sharp line.
(5) Bar must be free from defect or contamination.

Means for printing bar codes on a label are classified into the drum impact method and the wire dot method. In the drum impact method, bars set to a drum are struck through a ribbon onto a label fixed to a prescribed position of the base so as to carry out printing, therefore the method has disadvantages in that spacing between bars is liable not to be uniform since the structural reason and printing of correct bar code is difficult, a ribbon, ink or the like must be supplied corresponding to dissipation, and bars are susceptible to defect or contamination. In the wire dot method, a head composed of a suitable number of aligned wires is opposed through a ribbon to a printing surface of a label conveyed at a prescribed constant speed, and only wires with circular cross-section, set by a controller, are struck at regular intervals onto the printing surface during the label conveying so as to carry out printing. Therefore, the method had disadvantages in that the edge of the printed bar was uneven, non-uniformity of the label conveying or escape of the label prevented the correct bar code printing, and the printing speed was slow.

Accordingly, if the bar code, produced by the above mentioned methods, is read out by a stationary scanner or a pen reader, the reading is susceptible to mistake.

A bar code label may be provided with indication of trade marks or store names. In order to produce a bar code with marks, trade marks or store names are previously printed on labels, and the printed labels are charged in a printer for the bar code printing. Adoption of this process means that the conventional printer cannot print trade marks of store names. It also cannot produce a colorful printing with a combination of different colors.

Accordingly, printing cost of the above mentioned label is higher than that of white paper to be printed with only bar code by separate cost for printing trade marks orr store names.

Of course, labels with trade marks or store names can be used only in the specific store. This is also inconvenient.

SUMMARY OF THE INVENTION

In view of the above mentioned state of prior art, this invention intends to improve the input means, the coding means and the printing means of a bar code printer. Accordingly, it is a primary object of this invention to provide a bar code printer which can be versatile in that it can be used as a desk type bar code printer, a weighing bar code printer or the like by connecting other weighing instruments such as a weight printer or a price indicating balance. An embodiment therefor is characterized in that a change-over unit is interposed between an input unit and a signal control system, and an input circuit receiving input signals from outer instruments is connected to the change-over unit, and input signals from either the input unit or outer instruments are transmitted through the change-over unit to the signal control system.

A second object of this invention is to provide a bar code printer in which print data input through the input unit is divided into fixed part in common use and variable part with different numerals, thereby printing is carried out by changing the variable part only without input operation in the fixed part already input. An embodiment therefor is characterized in that prescribed numerals are previously input to columns in the fixed part and the variable part is set with the column designation before print data is inputted according to a selected marking code, and then numerals of print data are changeably input to columns of the variable part.

A third object of this invention is to provide a bar code printer in which flag code is input in the marking code setting operation, and flag code and check digit in the code system including the flag are together displayed in the indicating unit, thereby false inputting of bar code data is eliminated and working efficiency of input operation is improved. Bar code setting process therefor is characterized in that various types of bar code system are previously stored in the memory unit of the signal control system of a printer, and a flag code determining the code system is input using suitable input means, thereby position of flag and check digit corresponding to flag are displayed in the indicating unit controlled by the signal control system.

A fourth object of this invention is to provide a bar code printer in which price data included in the bar code print data can be printed in price code together with consumer's price mark, thereby code setting operation is improved in accuracy and working efficiency. An embodiment therefor is characterized in that signal control system is provided with means for determining the existence of price data included in bar code data and means for transmitting the price data if any and printing price data together with price mark on a label through the printing system.

A fifth object of this invention is to provide a bar code printer in which a printing unit can print bar code in high accuracy and high speed. An embodiment therefor is characterized in that a number of heating elements are aligned to constitute a printing head, said printing head is contacted with a heatsensitive color indicating surface of a label, said heating elements are electrically conducted according to prescribed conduction information, and either the printing head or the label having the heatsensitive color indicating property is transferred along the color indicating surface and perpendicularly to the aligning direction of the heating elements, thereby bar code is indicated on the label. Another embodiment is characterized in that either a label or a printing head of a printer is transferred in a prescribed direction, and the top end element of the head acts under application of prescribed voltage, thereby printing is carried out on a label, wherein the transferring length per unit time, the voltage applying period and the dimension of the top end element are suitably set so that the operation area according to the top element is overlapped in sequence at a prescribed amount.

A sixth object of this invention is to provide a printing method in which marks such as trade marks or store names are printed together with bar code although these marks cannot be printed in conventional printing means. An embodiment therefor is characterized in that a heating element is contacted with a printing surface of a label having a heat sensitive color indicating property, said heating element being supplied with printing power controlled by the signal control system, and marks together with bar code are printed on the printing surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram of a bar code printer;

FIG. 4 is an enlarged front view, partially cutaway, illustrating printing state by thermal head;

FIG. 5 is a sectional enlarged left-side view of FIG. 4;

FIG. 10 is a diagram illustrating key operation of programming when marking code is JAN8NONPLU type;

FIG. 11 is a diagram illustrating key operation during label issue;

DESCRIPTION OF THE PREFERRED EMBODIMENTS

Figure 1:
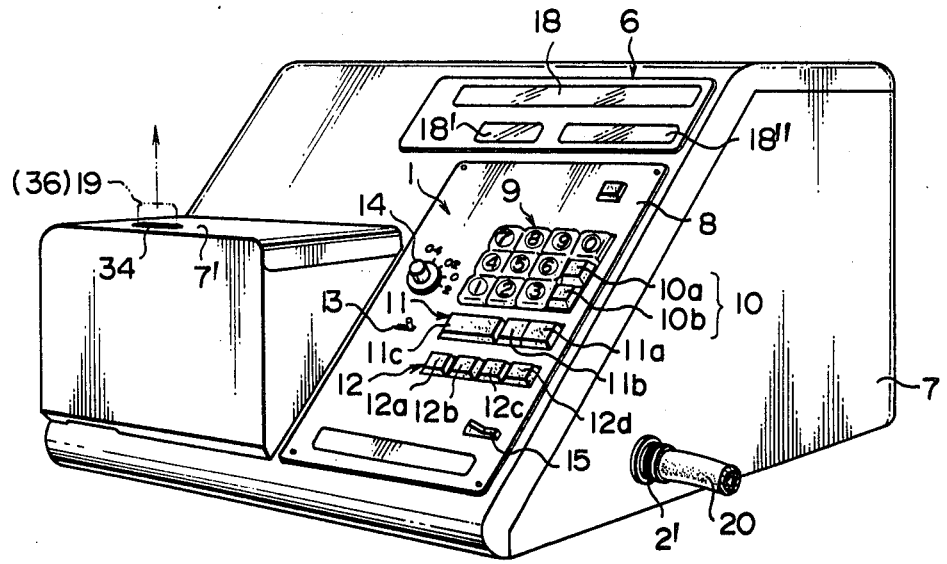
FIG. 1 is a perspective view of a bar code printer.
Figure 2:
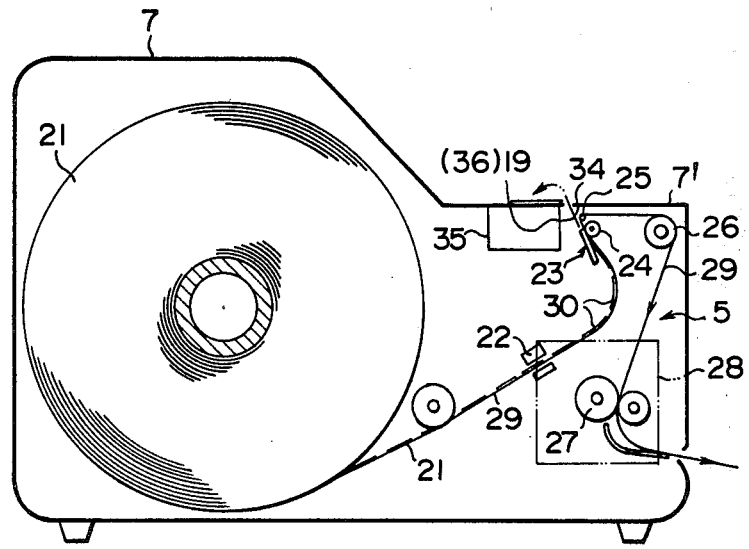
FIG. 2 is a sectional left-side elevation showing the inner mechanism of FIG. 1.

Referring to FIGS. 1 through 3, a bar code printer of the present invention comprises an input unit 1, and input circuit 2, a change-over unit 3, a signal control system 4, a bar code printing system 5 and an input data indicating system 6. The input unit is composed of keys arranged on an operation panel 8 in front of a casing 7. The input unit includes a ten-numeral key 9, a clear key 10, a function input key 11, a check key 11a, a blank key 11b, a manual key 11c, a code designating key 12, a program/issue change-over key 13, a dial switch 14 and a power switch 15. Each of keys 9 through 12 is connected to the change-over unit 3. These keys 9 through 12 are used to produce a bar code label for articles without necessity of weighing, such as processed foods or groceries. Corresponding to articles for marking, the most suitable type of code is selected.

The operation procedure will be described in the case of JAN8NONPLU type code. First the power switch is turned on, and then the program/label issue change-over switch 13 is changed to the program position for input operation. At the first step of the input operation, the blank key 11a is struck three times (because maximum number of columns to be displayed is set to thirteen columns in JAN13PLU type, and eight columns, from column 4 to column 11, in JAN8NONPLU type.) At the second step, "2" of the ten-numeral key 9 is struck so as to input flag code, and then item code of two columns is struck by operating the ten-numeral key 9 and further price code of four columns is struck by the ten-numeral key 9. At the third step, the check key 11a is struck so as to input module check digit of one column. Thereby article code of JAN8NONPLU type is struck in eight columns. And then the blank key 11b is struck twice (this is because of the same reason as the first step in parentheses) thereby the input operation is finished.

When the inputting of prescribed article code is finished by operating the input unit 1, the programmed code is displayed in numerals of eight columns at a display field 18 of the input data indicating system 6 as hereinafter described. If the program/label issue change-over switch 13 is changed to the label issue position, a bar code label 19 is produced by the bar code printing system 5 as hereinafter described.

The input circuit 2 receives input signals for bar code produced at input device of outer instruments such as a weight printer (not shown) or a price indicating balance (not shown). An input terminal 2' of the input circuit 2 is provided at suitable position on the side surface of the casing 7, thereby a connecting cord 20 to transmit input signals from outer instruments is detachably connected to the input terminal 2', and the output side of the terminal 2' is connected through the input circuit 2 to the change-over unit 3 as hereinafter described (FIGS. 1 and 3).

The input side of the change-over unit 3 is connected to the input unit 1 and the input circuit 2, and the output side thereof is connected to the control unit as hereinafter described. Thereby, an input signal from either the input unit 1 or an outer instrument is automatically connected to the control system 4.

The change-over unit 3 may be a manual change-over switch. Otherwise, it may be provided with a holding circuit so that whichever earlier coming signal from either the input unit 1 or the input circuit 2, even though the time difference is small, is transmitted to the control system 4 and the later coming signal is held, and as soon as the label issue by the earlier input signal is finished, the later signal is transmitted to the control system 4 in manual or automatic operation.

The signal control system 4 comprises a memory unit which stores code system or other data of bar code, a control unit which operates the indicating system 6 and the printing system 5, connected to the output side, in a prescribed condition according to the input signal, and an operation unit which receives the inputted signal and carries out information processing to the signal.

The input side of the control system 4 is connected to the output side of the change-over unit 3, and the output side thereof is connected to the bar code printing system 5 and the input data indicating system 6 as hereinafter described. Input signals transmitted from either the input unit 1 or outer instruments such as a weight printer through the change-over unit 3 to the control system 4 are processed their corresponding to the types of the code system so as to operate the bar code printing system 5 and the input data indicating system 6.

The bar code printing system 5 produces a bar code label 19 according to the printing command of the control system 4. Referring to FIG. 2, within the casing 7 are suitably disposed a label detector 22, a thermal head 23, a platen roller 24, a dispenser 25, a guide roller 26, a feed roller 27, a stepping motor 28 or the like in forward direction of a label roll paper 21. The label roll paper 21 is charged in the casing 7 and wound around these rollers in a prescribed form.

The label roll paper 21 comprises a base paper tape 29 on which non-printer labels 30 of heatsensitive paper constituted in a prescribed form are adhered at prescribed intervals.

The label detector 22 controls the stopped position of the label 30 intermittently transferred, and the control operation information is transmitted to the stepping motor 28 to set a feed amount of next label 30, so that the label 30 is always stopped in a prescribed position and the bar code printing system 5 is stopped short of the label 30.

Figure 6:
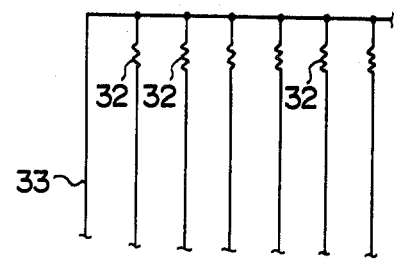
FIG. 6 is a wiring diagram of heating elements constituting a thermal head.
Figure 7:
FIG. 7 is a diagram of an example of a weight indicating label produced by a weight printer.
Figure 8:
FIG. 8 is a diagram of a bar code label produced by a bar code printer together with a weight indicating label when the weight printer for the weight indicating label as shown in FIG. 7 is connected to the bar code printer.

Referring to FIGS. 4 through 6, the thermal head 23 is composed of a number of heating elements 32 of fine dots aligned in a prescribed spacing and projected at a suitable number of positions on one surface of a substrate 31. The heating elements 32 are printed in parallel connection to a common wire 32. Individual heating pattern of heating elements 32, 32 . . . according to a printing command from the control system 4 and feeding of the label 30 enable a prescribed pattern to be printed on the label 30. Each of the heating elements 32 is set to a conducting mode individually by a controller (not shown).

The platen roller 24 is in opposition to the thermal head 23 and is forced toward the head 23 in a prescribed pressure, so that the label 30 together with the base paper 29 is pushed by the heating element 32 of the thermal head 23.

The dispenser 25, which is disposed in subsequent step of the thermal head 23 and the platen roller 24, separates the printed label 19 from the base paper 29 and serves as a guide for the base paper 29.

The feed roller 27 is attached to the shaft of the stepping motor 28 and feeds the base paper 29 intermittently by a prescribed length.

The stepping motor 28 is controlled by the label detector 22 and sets a feed amount of the label 30.

If a printing command from the control system 4 is generated at winding state of the label roll paper 21 around the bar code printing system 5 as shown in FIG. 2, the base paper 29 is fed at a prescribed constant speed by the feed roller 27 and the heating elments 32, 32 . . . of the thermal head 23 are supplied with their individual heating pattern. By the heating pattern of the elements 32, 32 . . . and feeding of the label 30 adhered to the base plate 29, the input signal is converted into bar code to be printed on the label 30. The bar code label 19 is pushed out of an issue slot 34 on the table surface 7' of the casing 7 by further feeding of the base paper 29, and then sticked and held in a label sticking unit 35.

The bar code printing operation by the thermal head 23 will be described in more detail referring to FIGS. 4 through 6. Accompanying the movement of the label roll paper 21, the label 30 is moved upwards at a prescribed constant speed, and current from the constant voltage source is supplid to the heating element 32 which arrives to the upper set line of the printing surface 30a.

The current supply to the heating element 32 is controlled by a controller (not shown) so that current is supplied only to the heating element 32 selected according to the bar code setting.

The heating element 32 receiving the current supply is heated to a prescribed temperature, and the printing surface 30a of the label 30, contacting with said heating element 32, is converted into place by the heat of the element 32. During further upward movement of the label 30 at a constant speed, various bars 38, 38 . . . are printed as shown in FIG. 4. When the heating element 32 is stopped, the bar code label of a prescribed amount is constituted.

The input data indicating system 6, disposed on the upper portion of the front surface of the casing 7, comprises an input data display field 18, a label issued number display field 18', and a price display field 18''. The input side of the input data indicating system 6 is connected to the output side of the control system 4. The input side of an input data indicating system 6 displays data transmitted from the input unit 1 or outer instruments such as a weight printer, a price indicating balance or the like.

Now, issue of the bar code labels 19, 36 for articles without necessity of weighing, such as processed foods or groceries and for articles to be weighed, such as meat, raw fishes, vegetables or fruits, will be described in the state that the connecting wire 20 of the weight printer (not shown) is connected to the input terminal 2' of the bar code printer.

Regarding issue of the bar code label 19 of articles without necessity of weighing, if data required for the bar code of articles, such as item code or price, or input to the input unit 1 of the bar code printer, an input signal generated by the input unit 1 is transmitted through the change-over unit 3 to the control system 4 and at the same time the input circuit 2 is disconnected from the control system 4, thereby the control system 4 operates the bar code printing system 5 and the input data indicating system 6 according to said input signal, and the bar code label 19 of the article is issued by the opertion of the bar code printing system 5.

Regarding the issue of the bar code label 36 of articles to be weighed, if data required for the bar code of said articles are input to input device of the weight priter connected to the bar code printer and the article is put onto the balance of the weight printer, the weight printer produces a weight indicating label 37 and transmits an input signal required for the bar code to the input circuit 2 of the bar code printer. The input signal transmitted to the input circuit 2 operated the change-over unit 3 so as to connect the input circuit 2 with the control system 4, thereby the control system 4 operates the bar code printing system 5 and the input data indicating system 6 according to the input signal from the input circuit 2. The code label 36 based on the weight indicating label 37 is issued by the operation of the bar code printing system 5 without operating the input unit 1 of the bar code printer.

In the above embodiment, if weighing instruments such as a weight printer, a price indicating balance, a digital indicating balance or a computer terminal device are suitably connected to the input circuit 2 of the bar code printer, one bar code printer may be used as an exclusive bar code printer or as a weighing bar code printer. Furthermore, if a computer with storage of various bar code data is connected to the input circuit 2, required bar code labels can be suitably produced without operating the input unit 1. Thus a versatile bar code printer can be provided.

Although a store selling both sorts of articles, i.e. those without necessity of weighing and those to be weighed, must install both of a desk type bar code printer and a weighing bar code printer individually in conventional manner, one bar code of the present invention can be used for both sorts of articles therefore saving cost and installation space. Furthermore, since bar code labels are produced at one position and the input operation may be effected at one step irrespective of sorts of articles, working efficiency of the issue of bar code labels is improved.

Figure 9:
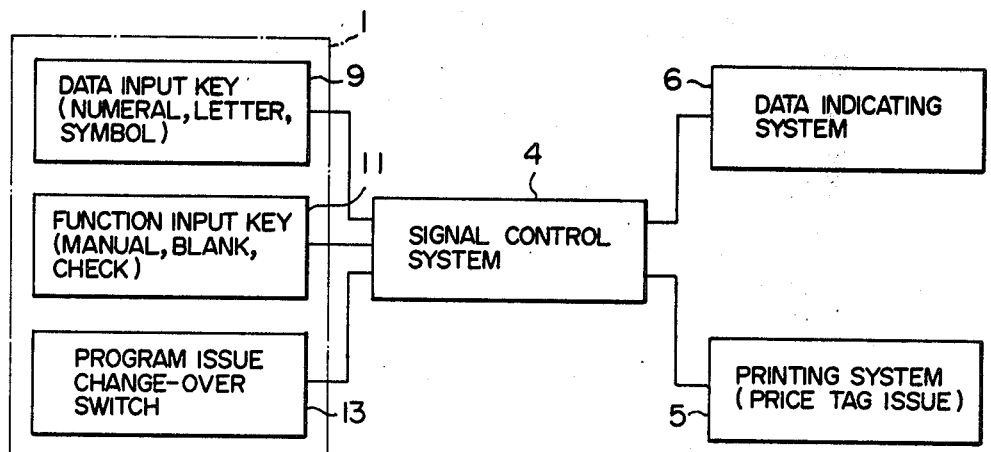
FIG. 9 is a block diagram of a modified embodiment of a bar code printer.

The inputting method in the above mentioned input unit 1 is now to be described more concretely, referring to a block diagram in FIG. 9 (The above mentioned input circuit 2 or change-over unit 3 may be optionally installed.).

The ten-numeral key 9 in the input unit 1 is composed of ten keys with numeral 0–9, and the key operation of the ten-numeral key 9 inputs print data of articles to each column according to selected marking code. The input operation also displays the data to be printed on the indicating system 6 at a prescribed number of columns. The clear key 10 comprises a single clear key 10a resetting on column only and a lamp clear key 10b resetting all columns simultaneously.

The manual key 11c sets one input corresponding to one column of marking code. The change of numerals in the column designated by the manual key 11c can be carried out irrespective of other columns in fixed part at input state of print data. The column designated by the manual key 11c in the display field 18 of the indicating system 6 is indicated by a suitable mark such as a lighting dot in the left-upward portion.

The check key 11a designates the column of check digit, and the column of the display field 18, designated by the input of the check key 11a, is indicated by a suitable mark such as letter "C".

The blank key 11b designates the unused column in the display field when the marking code with smaller number of columns is selected. The blank key 11b sets one input corresponding to one column, and the column designated by the blank key input is indicated by suitable means such as a mask.

The program/issue change-over switch 13 carries out the change-over between the marking code setting and the bar code label issue according to the print data input. When the change-over switch 13 is set to the program position, all columns may be input by the data input ten-numeral key 9 and the function input key 11; when it is set to the label issue position, only the column designated by the manual key 11c and the code designating key 12 may be input.

The control system 4 is connected in the input side to the data input ten-numeral key 9, the function input key 11 and the program/issue change-over key 13, and in the output side to the data indicating system 6 and the printing system 5. By input signals from the data input ten-numeral key 9, the function input key 11 and the program/issue change-over switch 13, the control system 4 controls the data indicating system 6 and the printing system 5 suitably in a prescribed working mode (FIG. 9).

The data display field 18 is divided into thirteen columns 100 corresponding to a maximum number of columns in the bar code system, and displayed by indicator tubes. The display is carried out with a "dash" in the case of programming, with a "numeral" in place of the dash when a numeral is inputted by the ten-numeral key 9, with the left-upward "dot" in place of a dash when the column in variable part is designated by the manual key 11c, with "C" in place of the dash when the check digit is designated to a prescribed column by the check key 11a, and with a "mask" (not lighting) in place of the dash when the blank column is designated by the blank key 11b. The input display by the manual key 11c may be freely carried out not only by a dot but by "," or other mark.

Operation of the printer is now described in the case of JAN8NONPLU type as an example. Eight columns, i.e. column 4, through column 11 in the display field 18 are used of the data input columns 100.

The operation is effected by turning on the power supply switch 15 first. Before inputting price data, code programming is carried out with one column of flag code, two columns of item code, first column of price and check digit as a fixed part and with residual three columns of price as a variable part.

The programming operation is carried out as shown in FIGS. 10 and 11. First the program/issue change-over switch 13 is set to the program position, and then the blank key 11b is struck three times to set three columns i.e. column 1 through column 3 in the display field 18 in blank.

The ten-numeral key 9 is struck at "2" to input flag "2" to column 4.

The ten-numeral key 9 is struck at "1" and "2" in sequence to input section "1" and "2" to column 5 and column 6 respectively.

The ten-numeral key 9 is struck at "0" to input price "0" to column 7.

The manual key 11c is struck three times consecutively to input the price variable part, i.e. second—fourth columns to column 8 through column 10 of field 100 manual display.

The check key 11a is struck to input check digit "C" to column 11.

Finally, the blank key 11b is struck twice to set column 12 and column 13 of field 100 in blank, and the code programming is completed.

After the code programming is completed by setting the fixed and variable parts, the issue operation of the bar code label 19, that is, the input operation of the variable part set at the programming is carried out.

After setting the program/issue change-over switch 13 to the issue position, the issue operation is effected as shown in FIG. 11. First, the ten-numeral key 9 is struck at "1", "5", "0" in sequence to input numerals "1", "5", "0" to column 8 through column 10 of field 100 designated by the manual key 11c.

When all numerals are input to the variable part designated by the manual key 11c, check digit is automatically calculated in the control system 4 and at the same time the printing system 5 is operated to issue the bar code label 19 according to the print data.

If the number of labels to be issued is previously set, the bar code labels of a prescribed number are continuously produced in automatic operation.

In order to issue the bar code label 19 of an article different only in numerals in lower three columns of price in the print data, the already inputted numerals are left unchanged and the manual key 11c is struck, thereby only numerals inputted in column 8 through column 10 of field 100, previously designated by the manual key 11c, are eliminated. If the ten-numeral key 9 is struck at "4", "2", "7" in sequence, numerals "4", "2", "7" are newly inputted to column 8 through column 10 and the bar code label 19 is issued according to the print data.

As above described, if the variable part is the lower three columns of the price data in the print data of the article to be sold, the manual key 11c designates the lower three columns of price data at the programming; if the variable part is in the last, one column of price data, the manual key 11c designates the last, one column at the programming. When the pricing work is transferred from one article to another, it is not necessary to input all print data newly but only to input numerals for entry in the columns of the variable part to be changed, leaving the numerals in the fixed part unchanged.

Figure 12:
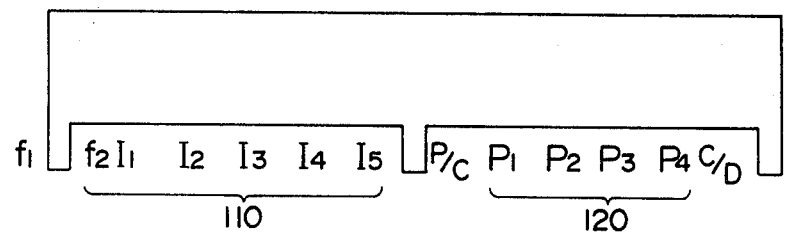
FIG. 12 is a schematic illustration of JAN13NONPLU type code system.

The code designating key 12 shown in FIG. 1 designates divisions composed of columns which can be variable part of the selected marking code, for example, any of maker code, item code, section and price, or combination thereof, at the inputting of print data. In the code printer, the code designating key 12 comprises the item code designating key 12a designating item code 110, the price designating key 12b designating price 120, the section designating key 12c designating section (not shown), and the maker code designating key 12d designating maker code (not shown). Of the columns of variable part designated by the manual key 11c at the programming, division composed of the columns as above described in designated at the inputting of print data. If the division such as the price designating key 12b is struck, numeral inputted in the price column 120 shown if FIG. 12 is eliminated and other numerals may be inputted to the column. If the manual key 11c is struck at the designation of a plurality of columns of variable part as shown in the above embodiment, numerals in the columns of the variable part are all eliminated. If the code designating key 12 is struck in this state, all numerals in columns of the variable part are not eliminated.

For example, if the item code designating key 12a is struck, only numeral inputted in the item code 110 is eliminated and another numeral may be newly inputted in the column. Similarly, if the price designating key 12b is struck, numeral inputted in the price key 120 is eliminated only and another numeral may be inputted there.

The code designating key 12 may designate any one of a plurality of columns of the variable part, in addition to designation of all columns in the various part. In the programming, the code designating key 12 may be used to designate the variable part in place of the manual key 11c.

Figure 13:
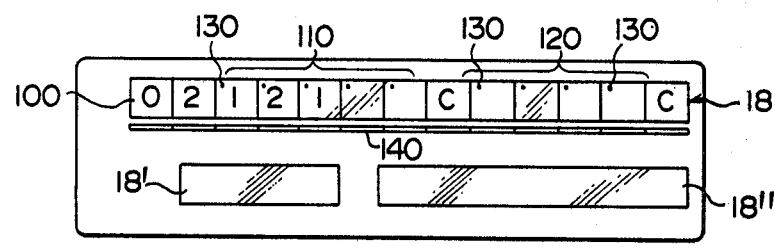
FIG. 13 is an enlarged view of a data display field showing columns designated by a manual key when marking code is JAN13NONPLU type.
Figure 14:
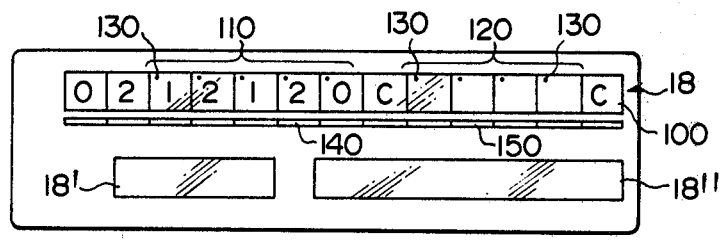
FIG. 14 is an enlarged view of data display field showing section indication designated by key operation after the state in FIG. 13.

Referring to FIG. 13 and FIG. 14, modification of above mentioned display means comprises columns 100 in display field 18 corresponding to columns designated by the manual key 11c, and divisions designated by the code designating key 12 are connected to respective keys 11c, 12 and displayed in the columns 100 and near the display field 18 by lighting of indicator tubes. The display is carried out by suitable marks such as dot 130 in column 100 in the case of columns designated by the manual key 11c, and dash 150 by the indicator tube 140 arranged along the lower edge of the display field 18 when divisions designated by the code designating key 12 is displayed.

In the case of JAN13NONPLU type as an example of marking code, referring to FIG. 13, if an item code 110 and price 120 are designated in variable part by the manual key 11c at the programming, the display is carried out by lighting of dot 130 in the left-upper portion of coresponding columns 100.

If only price 120 of the variable part is designated by the price code designating key 12b at the inputting of print data, indicator tubes 140 corresponding to columns of price 120 are lit in display of "dash" 150 shown in FIG. 14.

In addition, if "dot" 130 and "dash" 150 and divisions displayed by them are displayed in distinctive colors, designated columns in variable part can be easily recognized.

Code setting utilizing flag data determining code system of marking code will be described referring to FIG. 1 and FIGS. 15 through 18.

The signal control system 4 stores various types of code system in bar code in the memory unit. When flag 200 is imputted by key operation of the ten-number key 9 shown in FIG. 1 or by operation of the dial switch 14, check digit E of code system including flag 200 is carried out by letter "C" display in prescribed columns 100 of the display field 18.

Figure 15:
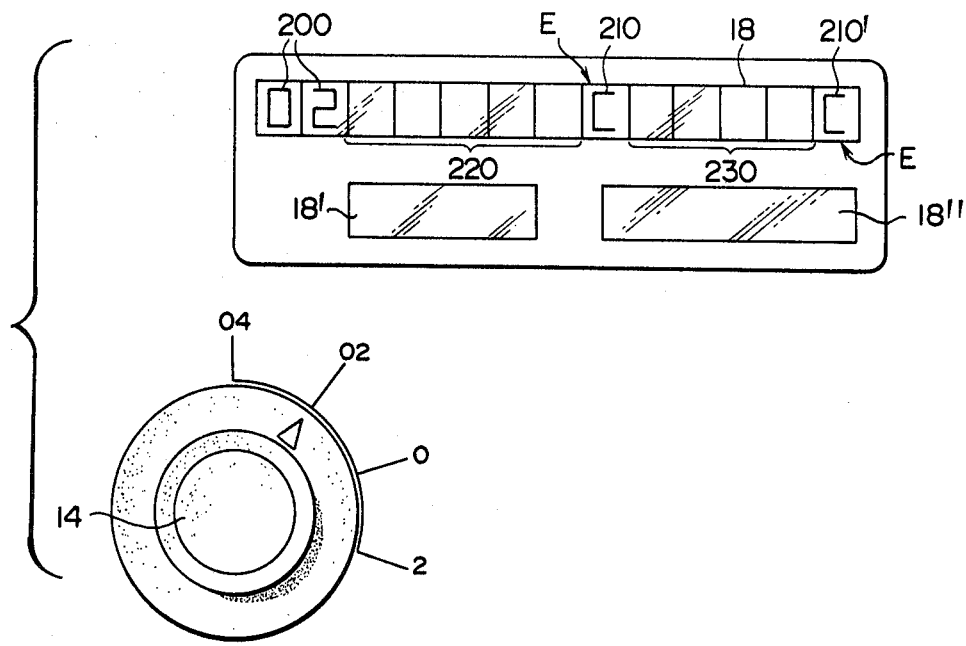
FIG. 15 and FIG. 16 are diagrams illustrating a relation between display field and a dial switch.

Referring to FIG. 15, code system of JAN13NONPLU type set with flag 200 at "02" is described. First, the program/label issue change-over switch 13 is set to the program position, and then the ten-numeral key 9 is struck at "0", "2" in sequence or the dial switch 14 is adjusted to position "02". Thereby code system of JAN13NONPLU type having flag 200 of "02" is read out from the memory unit of the signal control system 4 by input signal, and price check digit 210 and module check digit 210'.

Price check digit 210 and module check digit 210' are displayed in "C" at column 8 and column 13 of the display field 18, together with flag 200 in "02" in column 1 and column 2. Thereby item code 220 is in five columns, column 3 through column 7, and price code 250 is in four columns, column 9 through column 12. These columns are registered with item code and price code by key operation of the ten-numeral key 9. The program 1 label issue change-over switch 13 is changed to the program position, and bar code of JAN13NONPLU type is printed on a label by operating the signal control system 4 and the printing system 5.

Figure 16:
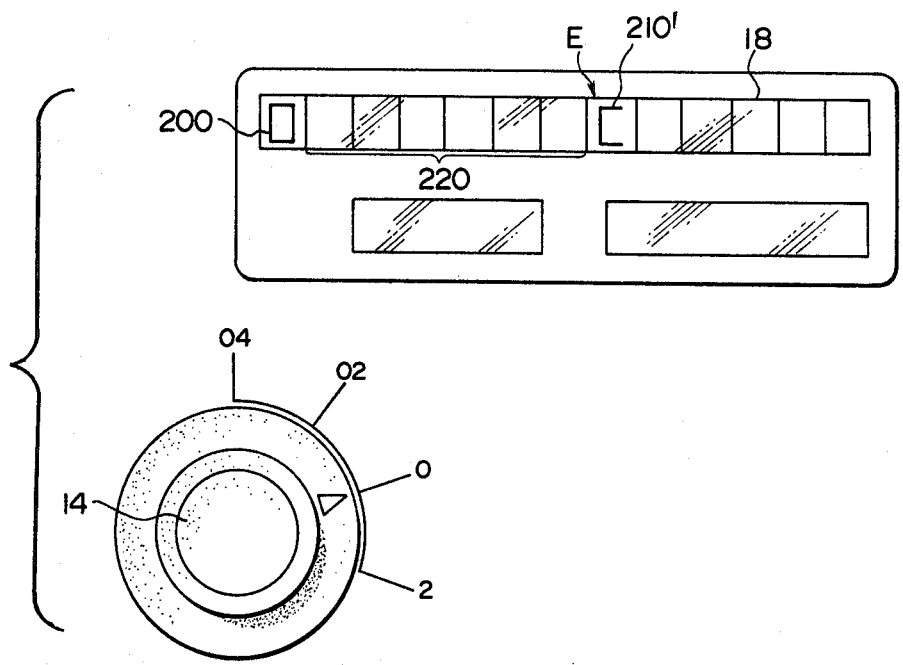

When code system of JAN8PLU type with flag code 200 at "0" is set as shown in FIG. 16, the ten-numeral key 9 is struck to "0" or the dial switch 14 is adjusted to position "0", thereby flag 200 is displayed to "0" at column 1 in similar fashion to JAN13NONPLU type. Module check digit "C" is displayed at column 8, thereby it is understood by an operator that the item code is in six columns, column 2 through column 7.

Since inputting of flag displays the position of the check digit in the code system and since the existence of price check digit, position of item code and price code is easily known by an operator, and code register is readily carried out without using the code contrast table, thereby efficiency of the bar code label issue operation is improved and input mistake of the bar code data is eliminated. It should be noted that, in this embodiment, the above-described check key (11a) and blank key (11b) may be omitted.

Figure 17:
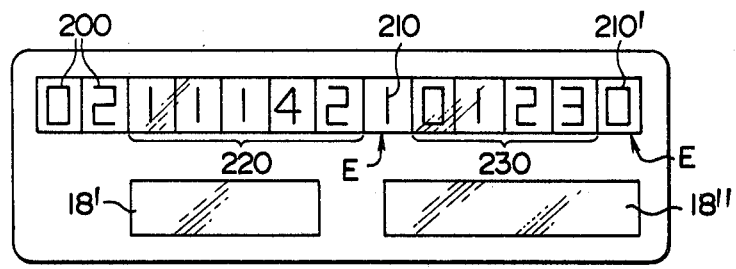
FIG. 17 and FIG. 18 are enlarged view of a display field.
Figure 18:
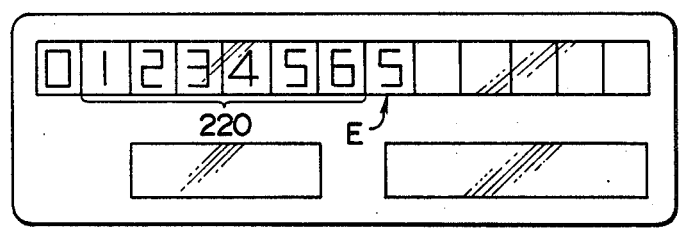
Figure 19:
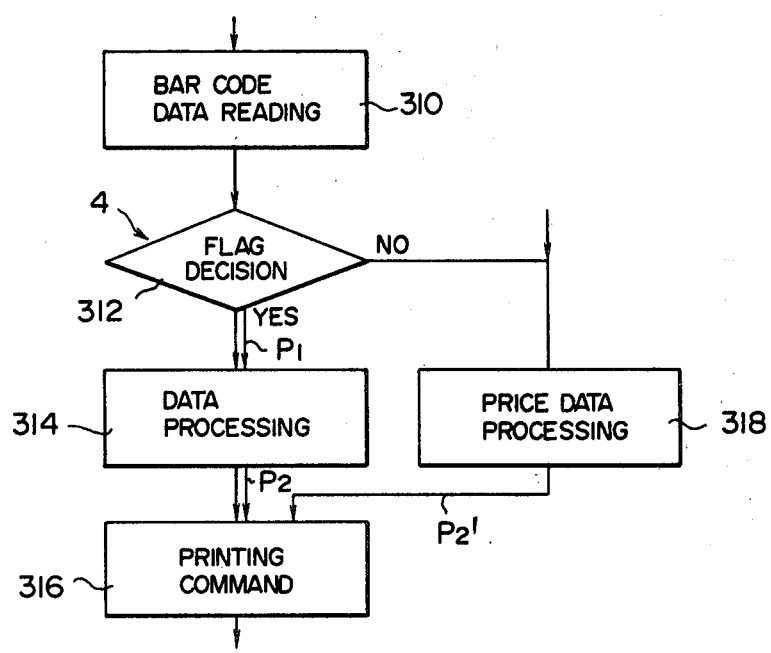
FIG. 19 is a flow chart showing operation of a signal control system.

Referring to FIGS. 16 through 18, automatic operation of numerals in check digit by the register of code data will be described in more detail.

Numerals in check digit (E) are calculated in a prescribed operation formula from numerals in flag 200, item code 220, price code 230 as variable. The operation formula is previously stored in the signal control system 4, columns in the display field 18 displayed by flag 200 are registered with code, and at completion of the register, numerals in check digit (E) are calculated using the input signal and the stored operation formula, also numerals are registered in columns in check digit E already registered to "C", according to constitution of the signal control system 4.

Flag 200 to "02" is displayed at column 1 and column 2 of the display field 18 as shown in FIG. 15, and the position of the check digit (E) is displayed to "C" at column 8 and column 13, thus the code system of JAN13NONPLU type is set. Operation of the ten-numeral key 9 registers item code of five columns such as "11142" and price code of four columns such as "0123" from column 3 in sequence. When the last column of the price code 230, i.e. column 12 of the display field 18 is registered to "3", numerals in the check digit (E) are automatically calculated by input signals of numerals in the flag code 200 to "02", item code 220 to "11142" and price code 230 to "0123". Price check digit 210 is displayed to "1", and module check digit 210' is displayed to "0" (FIG. 17).

Flag 200 to "0" is displayed at column 1 of the display field 18 as shown in FIG. 16, and position of module check digit 210' is displayed to "C" at column 8, thus code system of JAN8PLU type is set. Operation of the ten-numeral key 9 registers item code 220 of six columns such as "123456" from column 2 in sequence, and column of module check digit 210' is displayed to "5" (FIG. 18).

Display of the position of the check digit and the numerals thereof and the bar code data is not limited to the display field, but display in printing by the printing system may be freely carried out.

Since the numerals in the check digit are automatically calculated only by inputting bar code data in the above constitution, labor in numeral calculation is saved and issue of false labels caused by mistake in calculation of the check digit is completely eliminated.

Price printing means according to the signal control system 4 will be described referring to FIGS. 19 through 22.

The signal control system 4 comprises a bar code data reading unit 310, a flag decision unit 312, a data processing unit 314 and a printing command unit 316.

The bar code data reading unit 310 according to input signals from the input unit 1 reads out bar code data such as code data of flag (02)—item code—price code, flag (04)—item code in code system of JAN—13 (thirteen columns), or flag (2)—item code—price code, flag (0)—item code in code system of JAN—8 (eight columns), together with the code system.

The flag decision unit 312 reads out flag data in bar code data already read by the data reading unit 310 ("02", "4", "2", "0" in the above example), and determines the existence of price data.

In the above example, when flag "02" or "2" is read out, existence of price data is determined; when flag "04" or "0" is read out, the absence of price data is determined.

When the decision unit 312 determines the existence of price data, signal ($P_1$) together with the bar code data is transmitted to the data processing unit 314.

The data processing unit 314 performs operation processing of the bar code data. When signal ($P_1$) recognizing the price data is transmitted, the data processing unit 314 reads out price data from bar code data and transmits price mark ready signal ($P_2$) together with data signals into the printing command signal 316.

According to data signals and signal ($P_1$) from the data processing unit 314, the printing command unit generates the command to display code data in the display field 18 and to print article code and price mark in the printing system 5.

The printing command of price mark operates the printing system 5 to print the price data, read by the data processing unit 314, in the price printing column of the labels (FIGS. 20 through 22) or to indicate the price code with parentheses, underlines (〰〰, ———) the price code, or provides a color indication for ready recognition of numerals printed under the price code.

When the flag decision unit 312 determines flag "04" or "0", that is, the absence of price data in bar code data, a price data processing unit 318 is connected with the printing command unit 316 and price data from the input unit 1 is separately input to the price data processing unit 318, and signal ($P_2'$), transmitted from the price data processing unit 318 through the printing command unit 316, operates the printing system 5 to print the price mark on labels similarly to the above.

Figure 20:
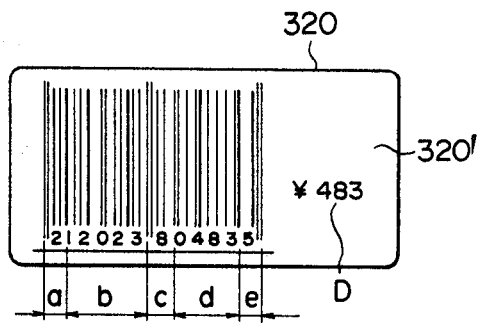
FIGS. 20 through 22 are plan views of labels.
Figure 21:
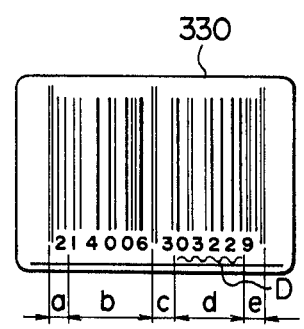
Figure 22:
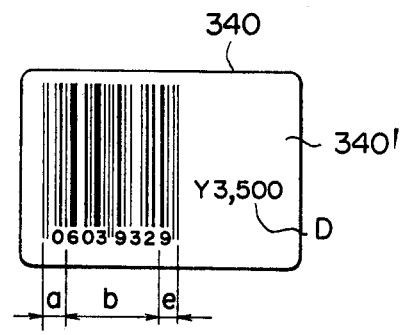

Referring to FIGS. 20 through 22, labels 320, 330 and 340 are printed by the printing system 5. The labels show the price code, the price including, (a) the flag code, (b) the item code, (c) the price check digit, (d) the price code, (e) the check digit and (D) the price mark.

In the label 320, price code data "0483" is read out and price mark (D) of "Y483" is indicated at price column 320' (FIG. 20). In the label 330, price mark is indicated under the price code data "0322" for the clear indication of price "Y322" (FIG. 21).

In the label 340, the flag decision unit 312 does not transmit signal ($P_1$) because of flag to "0". Therefore price data is separately input in the input unit 1 and the price mark (D) of "y3,500" is indicated at the price column 340' (FIG. 22).

In the labels 320 and 340, the article code column is continued to price column 320' and 340', but both columns may be divided by perforation for separate use of the price column 320' and 340' after printing.

Referring to FIGS. 23 through 26, modified embodiments of printing means in FIG. 4 and FIG. 6 will be described.

Figure 23:
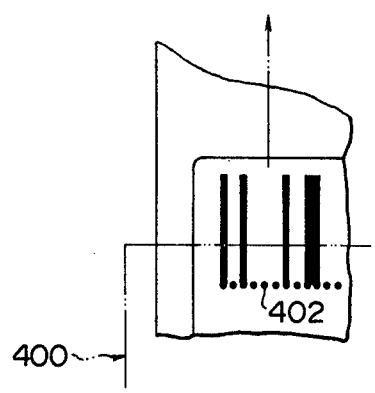
FIG. 23 is a partially cutaway front view illustrating a modified embodiment of the printing method.
Figure 24:
FIG. 24 is a reduced plan view of a label printed in FIG. 23.

Printing heat 4000 is constituted corresponding to the maximum of the total width of the conventional bar code, more particularly, the number of heating elements 402 aligned in prescribed intervals is set so that width of alignment the heating elements 402 coincides with maximum width of bar code (FIG. 23).

A number of heating elements set as above are equally divided in single or plural elements as one unit, and one information corresponds to one unit.

Figure 25:
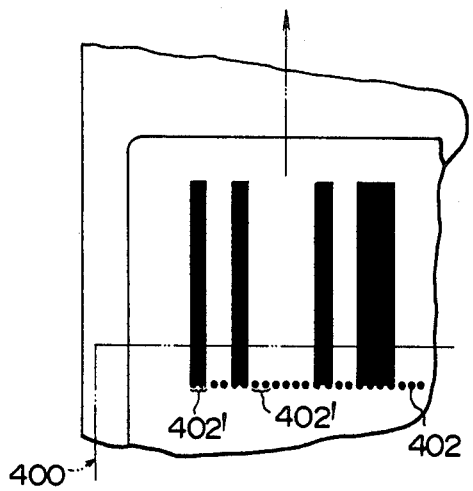
FIG. 25 is a partially cutaway front view illustrating another modification of the printing method.
Figure 26:
FIG. 26 is a reduced plan view of a label printed in FIG. 25.

When minimum bar code 404 is printed as shown in FIG. 23, one conduction information corresponds to one heating element 402. When bar code 406 of double dimension is printed as shown in FIG. 25, a lot of heating elements 402, 402 . . . constituting the heating head 400 are equally divided in two heating elements 402, 402 as one unit, and one conduction information corresponds to one unit 402' and the conduction time is twice as large as that of said minimum bar code. The time may be reduced in reverse application of the above manner.

According to printing method shown in the above FIGS. 4 through 6 and FIGS. 23 through 26, the edge of a bar becomes a sharp and correct line, enlargement or deduction of bar code is easily set, and length of bars is readily changed, thereby the problem of adhering space corresponding to various articles is eliminated.

In the above printing system, however, the width of a printed bar may not be constant throughout the length, and may become divergent upon heating by heating elements 32 and 402. Control means to prevent this divergence accompanying the heating of these elements are as follows:

(1) variation of voltage of printing head,
(2) variation of pressure against printing head,
(3) variation of label feeding speed.

Figure 27:
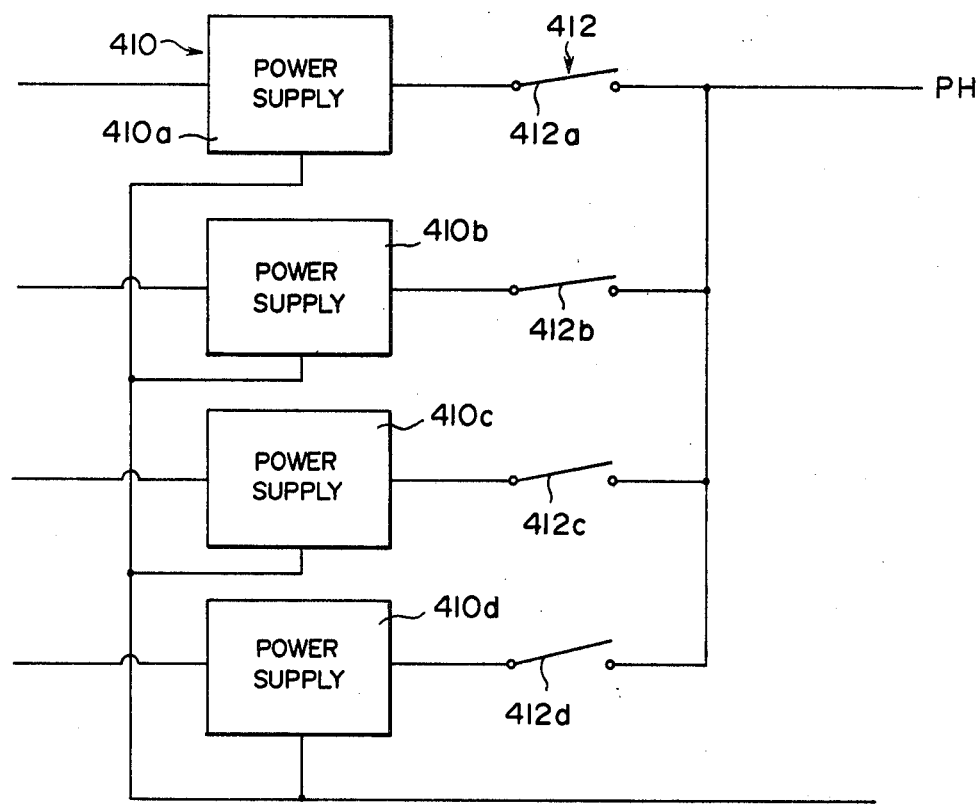
FIG. 27 is a circuit diagram of a control means in a further modification of the printing method.

Referring to FIG. 27, an embodiment of control means of said (1) will be described. FIG. 27 shows a circuit diagram of control means, comprising DC power supply 410 and time control switches 412.

The DC power supply 410 is divided into a plurality of power supply units e.g. four units 410a, 410b, 410c, 410d in reduced voltage in sequence. These power supply units 410a, 410b, 410c and 410d are connected in parallel with each other, and through relay switches 412a, 412b, 412c, 412d constituting a time control switch 412 respectively to the printing head 31.

Voltage difference between these power supply units 410a, 410b, 410c, 410d and the change-over time of the time control switch 412 are set according to the constant value determined by the feeding speed of the label 30 and temperature rise of the heating elements 32.

Since voltage applied to heating elements 32 in bar printing is reduced stepwise from the beginning to the end and the heating temperature is held always constant, width of the bar is printed in constant width throughout the length.

Color indicating member constituting the label 30 is not limited to heat sensitive paper (base paper with heat sensitive color indicating material applied) as above embodiment, but resin base or metal base may be used, or heat sensitive color indicating material may be impregnated in the base.

Figure 28:
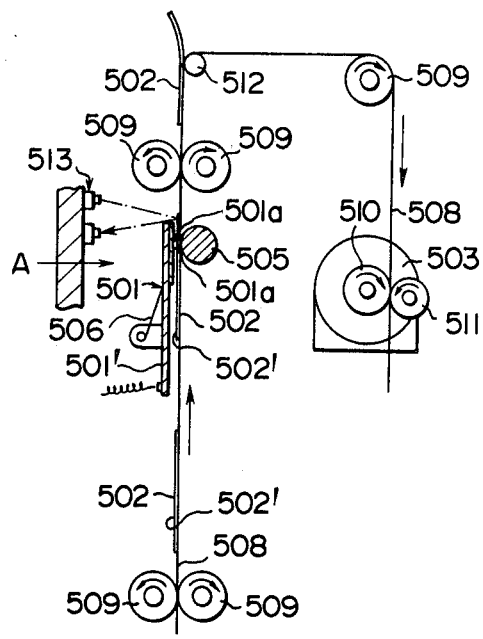
FIG. 28 is a sectional view illustrating a further embodiment of the printing means.
Figure 29:
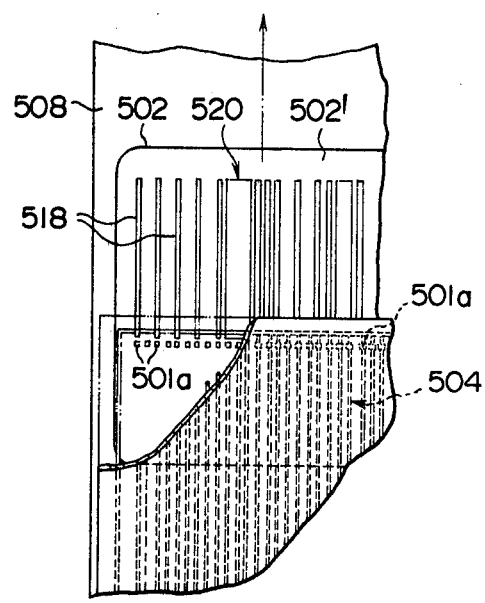
FIG. 29 is an enlarged view of FIG. 28 in the direction of arrow A.
Figure 30:
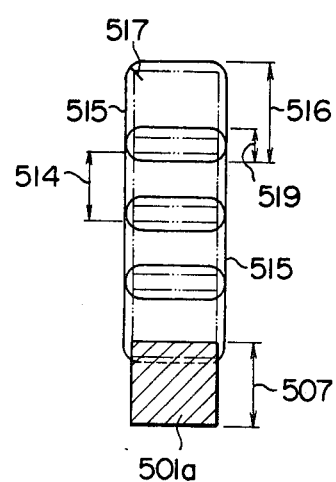
FIG. 30 is a schematic illustration of the printing method.

Referring to FIGS. 28 through 30 showing another printing means, feeding amount of either the label or the printing head per unit time, voltage application period to the printing head and dimension of the top end element are set so that the acting area according to the top end element is overlapped in sequence at a prescribed amount. The printing head is provided with the heating elements having the top end surface in square, rectangular, oval or other shape so that both sides of the top end surface includes linear portions in parallel with each other. Thermal head with heating elements arranged in prescribed form is used. Also head in wire dot manner is used where the top end surface of wire in conventional manner is formed as in the above heating element top end surface.

In the acting area of the top end element on a label, upper or lower edge of the area inevitably includes non-linear portion based on the element shape and the printing method. In order to feed either the label or the printing head in a prescribed direction and operate the printing head, and to print the bar with linear edge under overlapping of said acting area in sequence at a prescribed amount, the acting area is overlapped at least on the non-linear portion. The overlapping amount $l_1$ takes the value of the length l of the acting area according to the top end element reduced by the feed amount L or either the label or the printing head corresponding to one time of voltage application. So $l_1$ is given by $l_1 = l - L$.

Accordingly, in order to print the bar with linear edge on the label, feed amount $L_1$ of either the label or the printing head per unit time, voltage applying period T to the printing head, and the top end element dimension $l_2$ of the printing head are suitably set so that the equation $l_1 = l - L$ is satisfied.

A first method therefor is as follows:

The top end element dimension $l_2$ is set first. The length l of the acting area according to the top end element and the overlapping amount $l_1$ are obtained from the top end element dimension $l_2$. Since the feed amount L of either the label or the printing head corresponding to one time of voltage application is given by $L = l - l_1$ from the above equation, the feed amount $L_1$ per unit time is given by setting the voltage application period T.

A second method therefor is as follows:

The feed amount $L_1$ per unit time and the voltage application period T are set to suitable value first. When the printing unit is operated at the value of $L_1$ and T, the top end element dimension $l_2$ is determined so that the acting area on the label according to the element in sequence is overlapped at edge non-linear portion of upper and lower sides. Thereby values of $L_1$, T, $l_2$ are determined.

A third method therefor is as follows:

The feed amount L is determined by the above first method. The voltage application period T is determined by setting the feed amount $L_1$ per unit time freely.

In any method, values of $L_1$, T, $l_2$ are set so that the acting area on the label according to the top end element is overlapped in sequence, and the overlapping amount becomes longer than twice of the non-linear edge portion in upper and lower sides of the acting area.

Values of l and $l_2$ are determined by calculation but preferably by experiment. Relation between l and $l_2$ becomes $l < l_2$ at using the thermal head as the printing head, and $l = l_2$ at using the head of wire dot type.

When the thermal head is used as the thermal head, the label composed of base of paper such as heat sensitive paper, plastic resin, rubber or metal foil, with coating of color indicating layer, or that composed of base of paper or plastic resin, with impregnation of heat sensitive color indicating agent, i.e. the label with printing surface having heat sensitive color indicating property may be used.

Regarding the label form, a plurality of labels cut in a prescribed shape and detachably adhered on a paper band at prescribed intervals, or a continuous band of label of heat sensitive paper, or card-shaped labels changed in a cassette at a prescribed number of sheets may be used.

The feeding of either the label or the printing head may be constant-speed feeding or intermittent feeding. Stepping motor driving, ratchet driving, or gear driving may be used as the intermittent driving mechanism.

An example of the above printing means will be described referring to FIGS. 28 through 30, wherein the thermal head is used as the printing head and the setting of the label feed amount $L_1$ per unit time, the voltage application time T to the printing head and the top end element dimension $l_2$ is carried out according to the above first method. In FIG. 28, 501 shows the thermal head, 502 the label, and 503 the stepping motor.

The thermal head 501 comprises the body 501', a lot of heating elements 501a, 501a - - - aligned on the head 501', and the electric conduction circuit 504 connected so that the heating element 501a receives individual pulse voltage. Group of the heating elements 501a are forced at a prescribed pressure on a platen roller 505 by pivotal connection. The forcing of the heating element is carried out by the spring 506, and the electric conduction circuit 504 is connected to a control circuit (not shown).

The top end surface 501a' of the heating element 501a is formed in a square with side length $l_2$ (FIG. 30).

The label 502 is detachably adhered to the paper band 508 in prescribed intervals. The paper band 508 is inserted between the thermal head 501 and the platen roller 505, and wound around the guide roller 509, 509, and the feed roller 510 and the pushing roller 511 of the stepping motor 503 (FIG. 28). The dispenser 512 separates the printed label 502 from the band paper 508.

The stepping motor 503 feeds the band paper 508 intermittently, and the feeding is carried out according to control of the label detector 513 such as a photo-electric tube. If necessary, the intermittent feeding is carried out stepwise in small step in printing time when the detector 513 detects the label 502, and rapid feeding is carried out in other period.

When the detector 513 detects the top end of the label 512, feeding of the band paper 508 is stopped and the operation of the stepping motor 503 is controlled to feed the band paper 508 at the next printing command.

Operation of the stepping motor 503 and printing command generated to the thermal head 501 are synchronized by the control circuit (not shown).

At generating the printing command, the stepping motor 503 begins the intermittent feeding in small steps and at the same time the pulse voltage is applied to the thermal head 501 at the prescribed period T, and voltage is applied at stop period of the intermittent feeding.

The feeding amount $L_1$ of the label 502 per unit time by the stepping motor 503 hereinafter referred to as feeding amount $L_1$) is calculated by the dimension of the top end surface 501a' of the heating element 501a, i.e. the length $l_2$ (507) of the top end surface 501a' along the feeding direction of the label 502, and the pulse voltage application period T to the heating element 501a.

More particularly, referring to FIG. 30, the acting area 515 on the label in color indication with contact of the heating element 501a is in approximately square shape, with the side length $l' = l_2 + \alpha$ (516) larger than that at $l_2$ (517) of the top end surface 501a', and the corners of the square are chamfered at radius R (517). The overlapping length $l_1$ (519) of the bar 518 with linear side edge portion, obtained by overlapping of the acting area 515 in sequence, becomes the length twice as large as that of the non-linear portion in upper and lower sides of the acting area 515, that is, 2R. The feed amount L (514) corresponding to one time of the voltage application to the thermal head 501 (hereinafter referred to as feeding amount L) becomes $l_2 + \alpha - 2R$, since the above equation $l1 = l - L$ introduces $2R = (l_2 + \alpha) - L$ (wherein L: feeding amount, $l_2$: dimension of the top end surface of the top end element, $\alpha$: increment of the acting area at color indicating, 2R: overlapping amount $l_1$).

Multiplication of the feed amount L as above determined and the voltage application period T to the printing head previously set, i.e. LT becomes the feed amount $L_1$.

When data of any article required for bar code is inputted by operating an input device (not shown) at the dimension $l_2$ (507) of the top end surface (501a') of the heating element 501a, the voltage application period T to the thermal head 501, the feed amount $L_1$ of the label 502 per unit time, the printing command is generated through the control circuit to the stepping motor 503 and the thermal head 501, thereby the band paper 508 accompanied by the label 502 is fed intermittently at the prescribed feed amount L (514) and at the same time pulse voltage of the application period T is applied to heating elements 501a, 501a - - - selected synchronously during the stop time of the intermittent feeding.

When the heating elements 501a, 501a - - - are heated to a prescribed temperature at application of the pulse voltage thereto, the acting area 515, a little larger than the top end surface 501a' of the heating element 501a on the printing surface 502' contacting with the heating element, carries out color indication. By intermittent feeding of the label 502 synchronized to the pulse voltage application period T, the acting area 515 is overlapped to subsequent same acting area 515' in sequence at the overlapping amount $l_1$ (519) with color indication, thereby the bar code 520 composed of a prescribed number of bars 518 is printed on the printing surface 502' (FIG. 29, FIG. 30).

Pluse voltage is applied to the heating elements 501a therefore the heat storage is lost, and contacting position of the heating element 501a with the printing surface 502' at application of the pulse voltage is transferred linearly at the overlapping amount $l_1$ (519) of 2R in equivalence to the acting area 515, thereby the bar 518 is printed in uniform width throughout the length with linear edge portions.

When setting of $L_1$, T, $l_2$ is carried out according to the second method, the feed amount $L_1$ of the label 502 per unit time and the voltage application period T to the thermal head 501 are set to the values suitable for the stepping motor 503 and electronic devices respectively. When the printing unit is operating using these values of $L_1$ and T, the dimension $l_2$ of the heating element 501a and shape thereof are determined so that the acting area 515 on the label 502 applied in sequence is overlapped at non-linear portion of upper and lower sides, that is, the overlapping amount of the acting area 515 becomes $l_1$ thereby the thermal head 501 is produced.

When setting of $L_1$, T, $l_2$ is carried out according to the third method, the feeding amount L is determined similarly to the first method, and then the feeding amount $L_1$ of the label 502 per unit time by the stepping motor 503 is freely set, the voltage application period T to the thermal head 501 is determined by dividing the feeding amount $L_1$ by the feeding amount L, thereby electronic devices of the printing unit are produced.

Although the top end surface is in square form in the above description, the surface form may be rectangular form longer along the label feeding direction so that the intermittent feeding amount L of the label by the stepping motor is increased without earlier application of pulse voltage period T, thereby the printing speed of the bar code is increased without affecting the uniform length and clearness.

Figure 31:
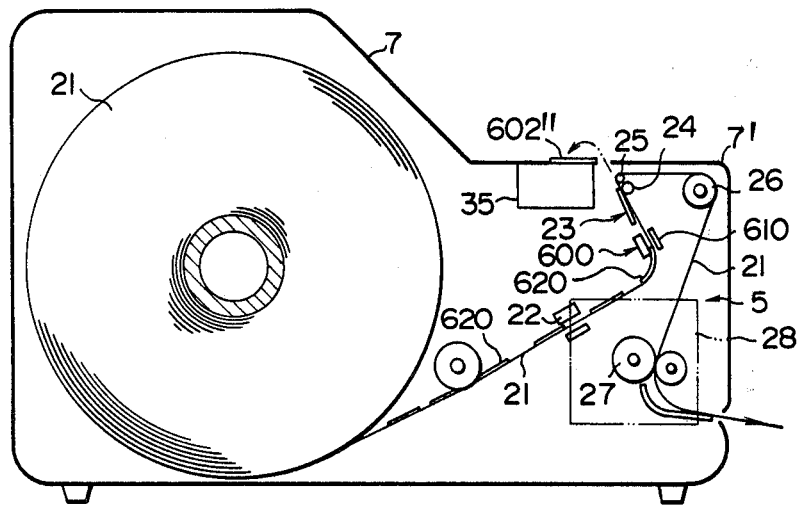
FIG. 31 is a sectional view of a bar code printer showing a modification of the printing method.
Figure 32:
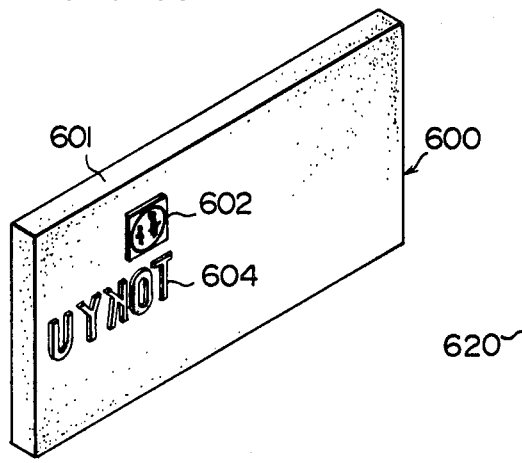
FIG. 32 is an enlarged perspective view of a heating plate.
Figure 33:
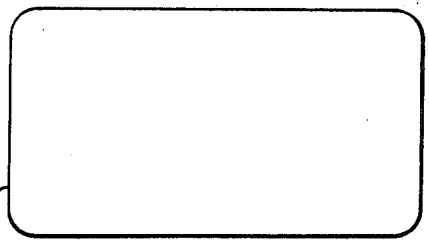
FIGS. 33 through 35 are plan views of labels respectively so as to illustrate the printing process.
Figure 34:
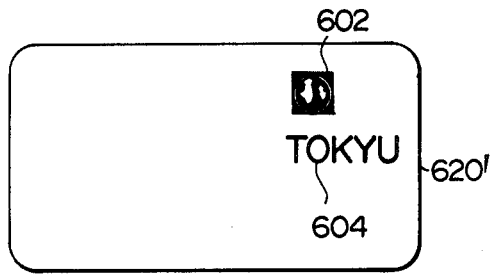
Figure 35:
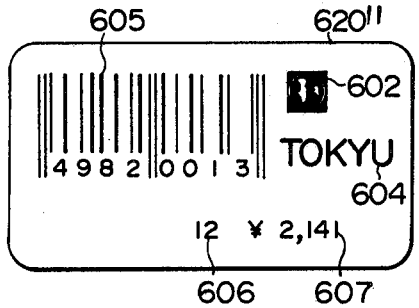

Referring to FIGS. 31 through 35, improvement of the label printing method, that is, the printing method of bar code together with marks such as trade marks or store names on the label printing surface. In FIG. 31, parts except a heating plate 600 and a receiving plate 610 are similar to those in FIG. 2, thereby these are designated in the same reference numbers and the description is omitted. The label is designated in reference number 620.

The heating plate 600 comprises the body 601 with the trade mark 602 and the store name 604 projecting at the front surface thereof. In similar manner to the thermal head 23, the heating plate 600 is heated to a prescribed temperature by application of electric power from the control unit of the printing control system at suitable time.

The heating plate 600 is movable forwards or backwards so that it is pushed towards the receiving plate 610 is opposition at a prescribed pressure when the printing command is generated.

The base paper 21 is transferred intermittently by the stepping motor 28. More particularly, the stepping motor 28 is controlled by the control unit of the printing control system. When the printing command is generated, the label 620 at ready state in front of the heating plate 600 is transferred by the stepping motor 28 to a prescribed forward position. When the heating plate 600 is moved forwards to print the trademark 620 and the store name on the label 620 and then moved backwards, the stepping motor 28 transfers the label 620' to the rear thermal head 23. The pulse voltage is applied to the thermal head 23 and at the same time the stepping motor 28 intermittently transfers the label 620' in synchronization with the pulse voltage application period so that the acting area on printing surface of the label 620' with color indication by the heating element 23a of the thermal head 23 is overlapped.

When the bar code 605, section 606, price 607, trademark 602, store name 604 are printed on the label, bar code data is input by the input unit such as the ten-numeral key in the bar code printer and the printer is set to the label issue position, thereby the printing command is generated by the signal control system, and the blank label 620 is transferred to a prescribed position in front of the heating plate 600 and printed by the heating plate 600 with the trademark 602 and the store name 604, for example, in red color.

After the trademark 602 and the store name 604 are printed, the printed label 620' is transferred to the thermal head 23, which prints the bar code 605, section 606, price 607, for example, in black. After this printing is completed, the label 620'' is further transferred and separated from the base paper 21 by the dispenser 25. Then the label 620'' with bar code 605, section 606, price 607, trademark 602 and store name 604 printed in two-tone color is issued from the outlet of the printer.

Although in the above embodiment the printing of bar code, price, trademark and store name is described, printing is not limited to this. Printing of weight, treated date, article name, margin, framing may be carried out in black and red together with others in similar manner. One thermal head may print above all matters, and in order to print bar code or mark in multiple colors according to this manner, the pulse voltage applied to the heating element takes different values so as to produce different values of the temperature of the heating elements.

In the above embodiment, after the printing command the heating plate prints trademark and store name and then the thermal head prints bar code, section, price. If the variable data such as bar code are printed according to the printing command and at the same time the fixed data such as trademark and store name are printed to next label using the heating plate, the printing process is reduced thereby the printing speed is increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim:

1. A bar code printer for producing bar code labels, comprising:
    an input unit means for introducing required input data into said bar code printer, said input data including prescribed numerals, and developing an input signal of prescribed form in accordance therewith;
    signal control system means responsive to said input signal for developing control signals in response thereto;
    bar code printing system means responsive to said control signals for printing said bar code labels in a specified format in accordance with said control signals,
    said bar code labels having columns designated as a fixed part and columns designated as a variable part,
    selected ones of said prescribed numerals in said input data being associated with the columns for the fixed part, and other selected ones of said prescribed numerals in said input data being associated with the columns of the variable part in response to identification by said input data introduced via said input unit means and an indicating system operatively responsive to said signal control system with display means responsive to said control signals for displaying the identified column numbers of the columns of the variable part, as distinguished from the fixed part.

2. A bar code printer in accordance with claim 1 wherein said display means comprises a plurality of indicator tubes for providing a dot display and a dash display.

3. A bar code printer in accordance with claim 1 wherein said bar code printer comprises a price tag printer.

4. A method for setting bar code in a bar code printer, said bar code printer including an input unit, a signal control system operatively responsive to said input unit, a bar code printing system and an indicating system operatively responsive to said signal control system, said signal control system including a memory unit for storing various types of code systems for said bar code therein, each of said code systems determining the construction of the bar code set in said bar code printer, said method comprising the steps of:

entering required input data into said bar code printer via said input unit, said input data including a flag for determining which of said code systems stored in said memory unit should be selected for ultimate determination of the construction of said bar code set in said bar code printer wherein said bar code is registered in said bar code printer by actuating a 10-numeral key on said input unit;

calculating a completion check digit; and displaying said calculated completion check digit on said indicating system.

* * * * *